UNITED STATES PATENT OFFICE.

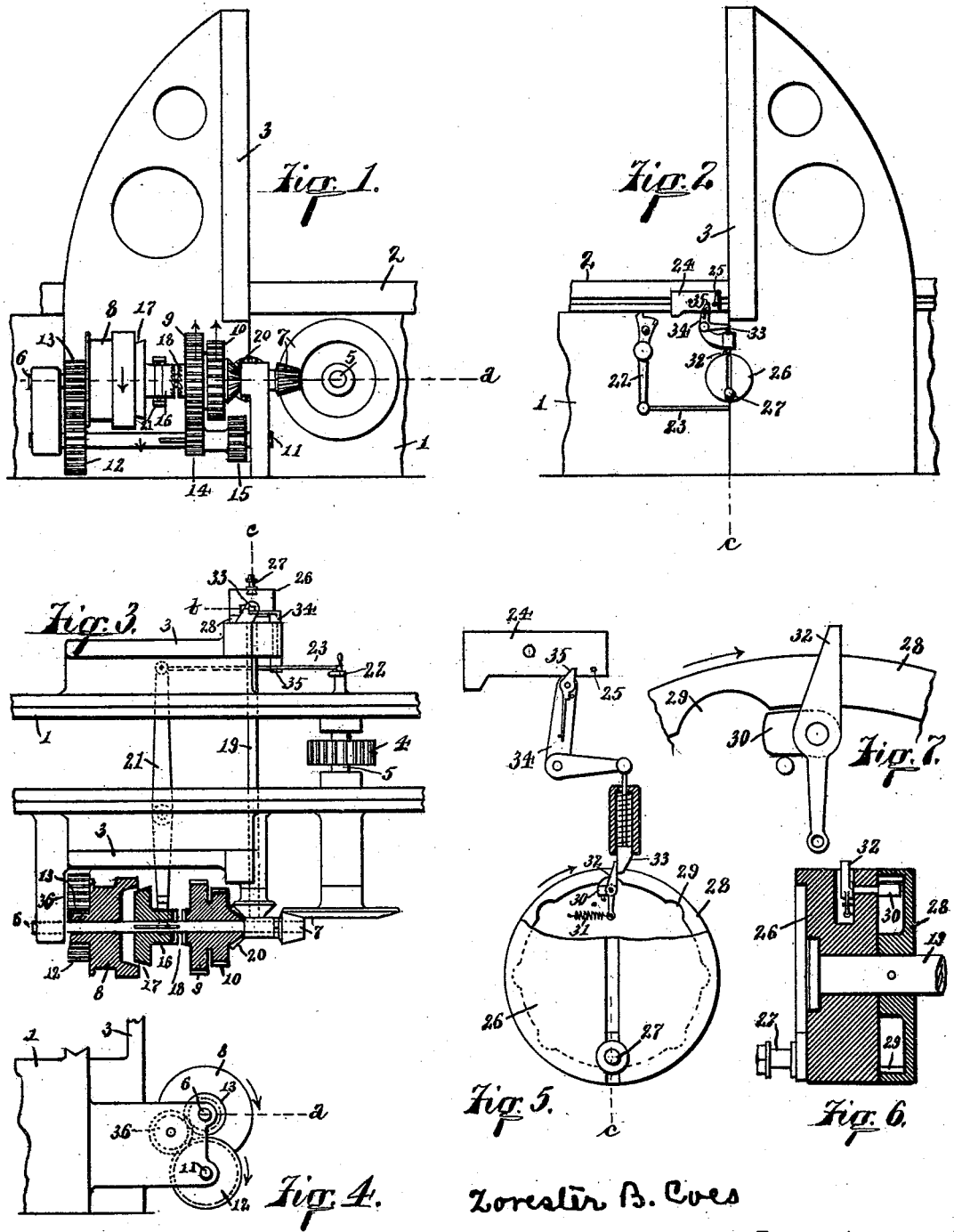

ZORESTER B. COES, OF HAMILTON, OHIO.

METAL-PLANING MACHINE.

SPECIFICATION forming part of Letters Patent No. 459,393, dated September 15, 1891.

Application filed April 20, 1891. Serial No. 389,571. (No model.)

*To all whom it may concern:*

Be it known that I, ZORESTER B. COES, of Hamilton, Butler county, Ohio, have invented certain new and useful Improvements in Metal-Planing Machines, of which the following is a specification.

My improvements will be readily understood from the following description, taken in connection with the accompanying drawings, in which—

Figure 1 is a rear side elevation of a metal-planing machine exemplifying my improvements; Fig. 2, a front side elevation of the same; Fig. 3, a plan of the same, the driving-pulley, &c., appearing in horizontal section in the plane of line $a$, Figs. 1 and 4; Fig. 4, a rear end elevation of the driving-gearing; Fig. 5, a front elevation, on an enlarged scale, of the feed-crank and its tripping mechanism, the front of the crank-disk being broken away to expose the pawl and the ratchet-disk beyond, and the case of the spring-latch appearing in vertical section in the plane of line $b$ of Fig. 3; Fig. 6, a vertical diametrical section of the feed-crank and ratchet-disk in the plane of line $c$, Fig. 3; and Fig. 7, an enlarged elevation of the feed-pawl and a portion of the ratchet-disk.

In the drawings, 1 indicates the usual planer-bed; 2, the usual table; 3, the usual housings; 4, the usual bull-wheel gearing into the table; 5, the usual bull-wheel shaft; 6, the driving-shaft, to be rotated by belt-power and to serve in giving motion to the various moving parts of the planer; 7, bevel-gearing connecting this driving-shaft with the bull-wheel shaft, the pinion of this bevel-gearing being fast on the driving-shaft 6, so that when the driving-shaft rotates the bull-wheel rotates and the table moves; 8, a cone-pulley loose on the driving-shaft, this pulley being intended to be driven continuously in one direction by a driving-belt and at a proper rate of speed to give proper backing speed to the table, the fact that the pulley has more than one diameter, providing, however, for alterations in this backing speed; 9, a gear loose on the driving-shaft; 10, another but smaller gear loose on the driving-shaft and fast to gear 9; 11, a shaft disposed parallel to the driving-shaft; 12, a gear fast on shaft 11; 13, a pinion fast to the cone-pulley and driving the gear 12 through an intermediate gear, so that shaft 11 revolves continuously as the cone-pulley revolves and in the same direction of motion, but at a slower speed; 14, a slip-pinion splined to shaft 11 and adapted to slide into and out of gear with gear 9; 15, another but larger slip-pinion similarly splined to shaft 11 and adapted to slide into and out of gear with gear 10, pinions 14 and 15 being preferably formed together, so that as one is moved out of gear the other is moved into gear; 16, a clutch splined to the driving-shaft 6; 17, a clutch on the cone-pulley adapted to be engaged by clutch 16, so that clutch 16 may serve as a means for locking the cone-pulley to the shaft at will, this clutch being by preference some form of friction-clutch, the exemplification showing a simple cone friction-clutch, which, however, may find its equivalent in any of the well-known forms of friction-clutches; 18, a clutch on gear 9, adapted to be engaged by clutch 16, which may thus serve as a means for locking gear 9 to the driving-shaft at will, the exemplification showing this clutch as of the toothed type, which, however, will find its equivalent in any other well-known efficient form of clutch; 19, a feed-shaft, designed to give motion to the usual feeding apparatus of the planer; 20, a bevel-gear fast with gears 9 and 10 and serving to continuously rotate the feed-shaft; 21, a shifter-lever exemplifying means through which the clutch 16 is shifted from the usual tumbler; 22, the usual tumbler upon the front of the planer, tapped, as usual, by the ordinary dogs, the resulting movement of the tumbler serving to shift the clutch and reverse the direction of motion, the usual handle on the tumbler permitting the clutch to be shifted also by hand; 23, a link, connecting the tumbler to the shifting-lever; 24, the usual cutting-stroke dog on the table, this dog making contact with the tumbler at the end of the backing-stroke and serving thus to shift the clutch and initiate the cutting stroke; 25, a projection from the dog to come in contact with a tappet and initiate the feeding motion; 26, the usual slotted feed-crank mounted on the feed-shaft, but in the present case loose thereon, but arranged to be temporarily locked thereto long enough to receive one revolution to produce the feed; 27, the usual crank-wrist of the feed-crank, from which, by means of the usual connecting-rod or other connection, the crank transmits the usual motions to the feeding apparatus of the machine; 28, a disk fast on the feed-shaft near the loose crank-disk; 29, teeth formed in this disk, the disk 28 thus becoming practically a ratchet-disk; 30, a pawl pivoted to the crank-disk 26 and adapted to swing outwardly into engagement with the teeth 29 of the ratchet-disk; 31, a spring connected with the pawl and tending to swing the pawl into engagement with the teeth of the ratchet-disk; 32, a lever on the pawl, projecting outwardly from the crank-disk and serving as a means by which, when the pawl is in engagement with a tooth, an obstruction in the path of the lever may tip the pawl out of engagement with the ratchet-wheel; 33, a spring-detent standing normally in the path of the lever 32 and serving to hold the pawl out of engagement with the ratchet-wheel and to hold the crank-disk and pawl in a single certain position of rotation, this detent being capable of retraction, so that the pawl may go into engagement and the crank-disk revolve till the detent again acts; 34, a lever connected with the spring-detent and exemplifying means by which the projection 25 of the dog can retract the spring-detent; 35, a spring-pawl on lever 34, through which the projection 25 acts on the lever, the object of this spring-pawl being to permit the projection to move the lever while the dog is moving to the left, and to permit the projection to ride past the lever without effect as the dog moves to the right, the spring-pawl 35 in the latter case yielding for the passage of the projection; 36, the intermediate gear previously referred to between pinion 13 and gear 12.

A single driving-belt is employed. It drives the cone-pulley 8 continuously in one direction. Gearing 13, 36, and 12 causes shaft 11 to revolve continuously in the same direction as the cone, but at slower speed. Pinion 14 therefore drives gear 9 continuously, but opposite in direction to that of the cone, and at a slower speed. By shifting the pinions 14 and 15 the driving can be done through pinion 15, thus giving to clutch 18 a faster speed. The two clutches 17 and 18 are thus continuously revolving in opposite directions and at different speeds upon the driving-shaft 6. By means of the clutch 16 either of these motions can be imparted to the driving-shaft. The quick motion (the direct motion) of the cone is employed for the backing motion, and the slow motion (that of clutch 18) is employed for the cutting motion. Therefore it will be seen that the shifting of the clutch will give to the planer either its quick backing motion or its slow cutting motion. By shifting the belt on the cone-pulley 8 the speed of the system may be changed, this change of speed applying both to the backing and to the cutting motion. Again, by shifting pinions 14 and 15 the ratio of backing speed to cutting speed may be altered. Thus there are two backing speeds and four cutting speeds provided with a single belt, and the system may of course be carried further by having more steps to the cone-pulley and by having more slip-pinions, &c., in an obvious manner. So, also, if changes in speed are not desired, the cone-pulley may have but a single step, and gearing 15 and 10 may be dispensed with. The table-dogs shift the tumbler in the usual manner, and thus effect the usual automatic reversal of the table motion.

I have illustrated the driving-shaft 6 as being disposed parallel with the bed of the planer and imparting motion to the bull-wheel shaft through the medium of bevel-gearing, but such disposition and method of transmission is simply one of many usually employed, and I contemplate such alternative disposition of driving-shaft 6 as will make my invention applicable to any of the usual systems of connection to the planer-table. Gearing 9 10 11 revolves continuously, and consequently through bevel-gears 20 the feed-shaft 19 will revolve continuously in one direction. The bevel-gearing 20 and the crossing shaft 19 is simply incidental to the fact that the chosen exemplification has the driving apparatus on one side of the planer and the feed-crank on the other side, such being a common disposition; but it is only essential in my invention that the feed-shaft should receive motion of rotation continuously and in one direction. Feed-crank 26, being loose on the revolving feed-shaft 19, remains normally stationary. It is desired that the feed-crank shall make one revolution at each cut taken by the planer. Therefore provision is made for locking the feed-crank to the shaft at the end of the backing-stroke, the duration of the locking corresponding to one rotation of the feed-shaft. The locking is initiated by the projection 25 on the cutting-stroke dog, thus causing the feed to take place at the end of the backing-stroke, but the projection may be arranged upon the backing-dog, if desired, to have the feed take place at the end of the cutting-stroke.

By inspecting Figs. 5 and 6 it will be understood that the crank-shaft 19 and the ratchet-disk 28 are continuously revolving in the direction of the arrow, the feed-crank 26 standing still and held by the detent, which also holds the pawl 30 out of engagement with the ratchet-disk. The spring-detent normally occupies this position, and if it be retracted its spring will tend to return it. When projection 25 strikes the pawl 35, the dog moving to the left, the detent will be retracted and spring 31 will throw pawl 30 into engagement with the ratchet-wheel, and the feed-crank 26 will become thereby locked to the feed-shaft and will proceed to revolve with it, and if the detent were kept out of the way would continue to do so indefinitely; but the projection 25 merely retracted the detent and then passed on to the left, permitting the detent to instantly return to its obstructing position. In the meantime the feed-crank has started and gotten beyond the immediate influence of the detent; but when the feed-crank has made a revolution the pawl-lever 32 again reaches the detent position and finds the detent on duty. The pawl is thrown out of action and the feed-crank arrested in an obvious manner. Thus at each retraction of the detent the feed-crank will make one revolution and then come to rest. The travel of the projection 25 to the right has no effect on the detent, the spring-pawl 35 yielding for the passage of the projection. Let it be particularly noticed that the feed motion is initiated by one of the table-dogs, and that any reversal of table motion by operating the tumbler by hand will not initiate the feed unless the table motion should happen to bring the projection 25 into engaging position. Therefore when the dogs are set for long strokes and the operator desires the table to make a few short strokes, as when adjusting the cutting-tool, he produces these short strokes as usual by operating the tumbler by hand, but in doing so he has not caused any feeding to take place. This result is a very desirable one. Should the operator wish to initiate a feeding impulse regardless of the position of the table, he has only to retract the detent by moving the lever 34 by hand.

I claim as my invention—

1. In a metal-planing machine, the combination, substantially as set forth, of a driving-shaft arranged to transmit motion to the table, a double-clutch thereon, a belt-pulley loose on the driving-shaft and provided with a pinion and adapted to be clutched by said clutch, a gear loose on the driving-shaft and adapted to be clutched by said clutch, a second shaft disposed parallel to the driving-shaft and geared to said pinion and gear, and clutch-throwing mechanism connecting said clutch with the reversing-tumbler of the machine.

2. In a metal-planing machine, the combination, substantially as set forth, of a driving-shaft arranged to transmit motion to the table, a double-clutch thereon, a belt-pulley loose on said shaft and provided with a pinion and adapted to be clutched by said clutch, united gears loose on said shaft and adapted to be clutched by said clutch, a parallel shaft geared to said pinion, slip-pinions on the parallel-shaft, adapted to engage with said united gears, and clutch-throwing mechanism connecting said clutch with the reversing-tumbler of the machine.

3. In a metal-planing machine, the combination, substantially as set forth, of a driving-shaft arranged to transmit motion to the table, a double clutch thereon, a cone-pulley loose on said shaft and provided with a pinion and adapted to be clutched by said clutch, a gear loose on said shaft and adapted to be clutched by said clutch, a parallel shaft geared to said pinion and gear, and clutch-throwing mechanism connecting said clutch with the reversing-tumbler of the machine.

4. In a metal-planing machine, the combination, substantially as set forth, of a driving-shaft arranged to transmit motion to the table, a double clutch thereon, a cone-pulley loose on said shaft and provided with a pinion and adapted to be clutched by said clutch, united gears loose on said shaft and adapted to be clutched by said clutch, a parallel shaft geared to said pinion, slip-pinions on said parallel shaft adapted to engage said united gears, and clutch-throwing mechanism connecting said clutch with the reversing-tumbler of the machine.

5. In a metal-planing machine, the combination, substantially as set forth, of a driving-shaft, a double clutch thereon, a belt-pulley loose on the shaft and adapted to be clutched by said clutch, a rotary part loose on said shaft and adapted also to be clutched by said clutch, means for transmitting motion from said belt-pulley to said rotary part at a lower speed and in a reverse direction, and clutch-throwing mechanism connecting said clutch with the reversing-tumbler of the machine.

6. In a metal-planing machine, the combination, substantially as set forth, of a driving-shaft, a belt-pulley loose thereon, a friction-clutch for locking the pulley to the shaft, a gear loose on said shaft, a toothed clutch for locking said gear to the shaft, means for transmitting motion from said belt-pulley to said gear at a lower speed and in a reversed direction, and clutch-operating mechanism connected with the reversing-tumbler of the machine.

7. In a metal-planing machine, the combination, substantially as set forth, of a rotary feed-shaft arranged to turn continuously in one direction, a feed-crank loose thereon, mechanism serving to lock the crank to the shaft and provided with a moving lever, which when arrested will unlock the crank from the shaft and arrest the crank, a detent normally in the path of said moving lever, a projection on one of the table-dogs of the machine, and means for causing said projection to temporarily remove the detent from the path of the moving lever.

8. In a metal-planing machine, the combination, substantially as set forth, of a rotary feed-shaft arranged to turn continuously in one direction, a toothed disk fast thereon, a crank-disk loose thereon, a pawl carried by the crank-disk, a spring to cause the pawl to engage, a lever connected with the pawl and projecting from the crank, a detent normally in the path of said lever, and a projection on one of the table-dogs, arranged to temporarily remove the detent from the path of the lever.

ZORESTER B. COES.

Witnesses:
J. W. SEE,
P. P. SHEEHAN.